(12) United States Patent
Liu et al.

(10) Patent No.: US 10,747,292 B2
(45) Date of Patent: *Aug. 18, 2020

(54) DYNAMIC VOLTAGE FREQUENCY SCALING DEVICE AND METHOD

(71) Applicant: Shanghai Cambricon Information Technology Co., Ltd, Pudong New Area (CN)

(72) Inventors: Shaoli Liu, Pudong New Area (CN); Lei Zhang, Pudong New Area (CN); Tianshi Chen, Pudong New Area (CN)

(73) Assignee: SHANGHAI CAMBRICON INFORMATION TECHNOLOGY CO., LTD, Pudong New Area (CN)

( * ) Notice: Subject to any disclaimer, the term of this patent is extended or adjusted under 35 U.S.C. 154(b) by 5 days.

This patent is subject to a terminal disclaimer.

(21) Appl. No.: 16/528,948

(22) Filed: Aug. 1, 2019

(65) Prior Publication Data

US 2019/0354156 A1 Nov. 21, 2019

Related U.S. Application Data

(63) Continuation of application No. 16/482,710, filed as application No. PCT/CN2018/095548 on Jul. 13, 2018.

(30) Foreign Application Priority Data

Oct. 29, 2017 (CN) .......................... 2017 1 1029543

(51) Int. Cl.
*G06F 1/32* (2019.01)
*G06N 3/04* (2006.01)
*G06N 3/06* (2006.01)
*G06F 1/3206* (2019.01)
*G06N 3/063* (2006.01)
*G06F 1/3296* (2019.01)
*G06F 1/324* (2019.01)

(52) U.S. Cl.
CPC ............ *G06F 1/3206* (2013.01); *G06F 1/324* (2013.01); *G06F 1/3296* (2013.01); *G06N 3/0481* (2013.01); *G06N 3/0635* (2013.01)

(58) Field of Classification Search
CPC ...... G06F 1/3206; G06F 1/324; G06F 1/3296; G06F 3/0635; G06F 3/0481
See application file for complete search history.

(56) References Cited

U.S. PATENT DOCUMENTS 4,642,388 A * 2/1987 Young ..................... C07C 45/49
568/454
9,632,567 B2 * 4/2017 Park ...................... G06F 1/3296
(Continued)

*Primary Examiner* — Stefan Stoynov
(74) *Attorney, Agent, or Firm* — Getech Law LLC; Jun Ye

(57) ABSTRACT

The application provides a Dynamic Voltage Frequency Scaling device including an information acquisition unit configured to acquire working state information or application scenario information of a chip connected with the Dynamic Voltage Frequency Scaling device in real time and a voltage frequency scaling unit configured to send voltage frequency scaling information to the chip according to the working state information or the application scenario information of the chip. The embodiment of the application dynamically scales the voltage frequency on chip-level and reduces the power consumption of chips.

24 Claims, 4 Drawing Sheets

(56) References Cited

U.S. PATENT DOCUMENTS

| | | | |
|---|---|---|---|
| 2014/0198950 A1* | 7/2014 | Tanaka | G06K 9/00771 |
| | | | 382/103 |
| 2015/0180482 A1* | 6/2015 | Bourstein | H03L 7/00 |
| | | | 323/234 |
| 2017/0031430 A1* | 2/2017 | Ansorregui | G06F 1/3203 |
| 2017/0147053 A1* | 5/2017 | Chang | G06F 1/3296 |

* cited by examiner

DYNAMIC VOLTAGE FREQUENCY SCALING DEVICE AND METHOD

TECHNICAL FIELD

The disclosure relates to the electronic field, and particularly to a DVFS (Dynamic Voltage Frequency Scaling) device and method.

BACKGROUND

Along with increase of a working frequency and constant development of a semiconductor process, a problem about power consumption of a chip has become an important factor considered for a deep sub-nanometer integrated circuit. Dynamic Voltage Frequency Scaling (DVFS) is a DVFS technology which is widely adopted for the field of semiconductors at present. The DVFS technology dynamically scales a running frequency and voltage of a chip (for the same chip, if the frequency is higher, a higher voltage is required), thereby achieving a purpose of saving energy. However, in related arts, there are no DVFS methods and corresponding device designs applied to intelligent chips and it is impossible to complete advanced scaling over a voltage and a frequency of a chip by use of application scenario information.

SUMMARY

An aspect of the application provides a DVFS device, which may include:

an information acquisition unit configured to acquire working state information or application scenario information of a chip connected with the DVFS device in real time, in which the application scenario information may be information obtained by the chip through neural network computation or acquired by a sensor connected with the chip; and a voltage frequency scaling unit configured to send voltage frequency scaling information to the chip according to the working state information or the application scenario information of the chip, in which the voltage frequency scaling information may be configured to instruct the chip to scale its working voltage or working frequency.

An embodiment of the application, the working state information of the chip may include an operating speed of the chip, the voltage frequency scaling information may include first voltage frequency scaling information, and the voltage frequency scaling unit may be configured to:

if the operating speed of the chip is greater than a target speed, send the first voltage frequency scaling information to the chip, in which the first voltage frequency scaling information may be configured to instruct the chip to decrease its working frequency or working voltage, and the target speed may be an operating speed of the chip if a user requirement is met.

An embodiment of the application, the chip may include at least a first unit and a second unit. Output data of the first unit is input data of the second unit. The working state information of the chip may include an operating speed of the first unit and an operating speed of the second unit. The voltage frequency scaling information may include second voltage frequency scaling information. The voltage frequency scaling unit may be further configured to:

in response to determining, according to the operating speed of the first unit and the operating speed of the second unit, that a running time of the first unit exceeds a running time of the second unit, send the second voltage frequency scaling information to the second unit, in which the second voltage frequency scaling information may be configured to instruct the second unit to decrease its working frequency or working voltage.

An embodiment of the application, the voltage frequency scaling information may include third voltage frequency scaling information, and the voltage frequency scaling unit is further configured to:

in response to determining, according to the operating speed of the first unit and the operating speed of the second unit, that the running time of the second unit exceeds the running time of the first unit, send the third voltage frequency scaling information to the first unit, in which the third voltage frequency scaling information may be configured to instruct the first unit to decrease its working frequency or working voltage.

An embodiment of the application, the chip may include at least N units. The working state information of the chip may include working state information of at least S units in the at least N units, in which N may be an integer larger than one and S may be an integer less than or equal to N. The voltage frequency scaling information may include fourth voltage frequency scaling information, and the voltage frequency scaling unit may be configured to:

in response to determining, according to the working state information of a unit A, that the unit A is in an idle state, send the fourth voltage frequency scaling information to the unit A, in which the fourth voltage frequency scaling information may be configured to instruct the unit A to decrease its working frequency or working voltage, where the unit A is any one of the at least S units.

An embodiment of the application, the voltage frequency scaling information may include fifth voltage frequency scaling information, and the voltage frequency scaling unit may be configured to:

in response to determining, according to the working state information of the unit A, that the unit A returns to a working state, send the fifth voltage frequency scaling information to the unit A, in which the fifth voltage frequency scaling information may be configured to instruct the unit A to increase its working voltage or working frequency.

An embodiment of the application, an application scenario of the chip is image recognition, the application scenario information may include the count of objects in an image to be recognized, the voltage frequency scaling information may include sixth voltage frequency scaling information, and the voltage frequency scaling unit may be configured to:

in response to determining that the count of the objects in the image to be recognized is less than a first threshold value, send the sixth voltage frequency scaling information to the chip, in which the sixth voltage frequency scaling information may be configured to instruct the chip to decrease its working voltage or working frequency.

An embodiment of the application, the application scenario information is object tag information, the voltage frequency scaling information may include seventh voltage frequency scaling information, and the voltage frequency scaling unit may be configured to:

in response to determining that the object tag information belongs to a preset object tag set, send the seventh voltage frequency scaling information to the chip, in which the seventh voltage frequency scaling information may be configured to instruct the chip to increase its working voltage or working frequency.

An embodiment of the application, the chip is applied to voice recognition, the application scenario information is a voice input rate, the voltage frequency scaling information may include eighth voltage frequency scaling information, and the voltage frequency scaling unit may be configured to:

if the voice input rate is lower than a second threshold value, send the eighth voltage frequency scaling information to the chip, in which the eighth voltage frequency scaling information may be configured to instruct the chip to decrease its working voltage or working frequency.

An embodiment of the application, the application scenario information is a keyword obtained by voice recognition performed by the chip, the voltage frequency scaling information may include ninth voltage frequency scaling information, and the voltage frequency scaling unit may be configured to:

if the keyword belongs to a preset keyword set, send the ninth voltage frequency scaling information to the chip, in which the ninth voltage frequency scaling information may be configured to instruct the chip to increase its working voltage or working frequency.

An embodiment of the application, the chip is applied to machine translation, the application scenario information may include a character input speed or a number of characters in an image to be translated, the voltage frequency scaling information may include tenth voltage frequency scaling information, and the voltage frequency scaling unit may be configured to:

if the character input speed is lower than a third threshold value or the count of the characters in the image to be translated is less than a fourth threshold value, send the tenth voltage frequency scaling information to the chip, in which the tenth voltage frequency scaling information may be configured to instruct the chip to decrease its working voltage or working frequency.

An embodiment of the application, the application scenario information is an external light intensity, the voltage frequency scaling information may include eleventh voltage frequency scaling information, and the voltage frequency scaling unit may be configured to:

if the external light intensity is lower than a fifth threshold value, send the eleventh voltage frequency scaling information to the chip, in which the eleventh voltage frequency scaling information may be configured to instruct the chip to decrease its working voltage or working frequency.

An embodiment of the application, the chip is applied to image retouching, the voltage frequency scaling information may include twelfth voltage frequency scaling information and thirteenth voltage frequency scaling information, and the voltage frequency scaling unit may be configured to:

if the application scenario information is a face image, send the twelfth voltage frequency scaling information to the chip, in which the twelfth voltage frequency scaling information may be configured to instruct the chip to decrease its working voltage, and if the application scenario information is not a face image, send the thirteenth voltage frequency scaling information to the chip, in which the thirteenth voltage frequency scaling information may be configured to instruct the chip to decrease its working voltage or working frequency.

Another aspect of the application provides a DVFS method, which may include that:

acquiring working state information or application scenario information of a chip connected with a DVFS device in real time, in which the application scenario information may be information obtained by the chip through neural network computation or acquired by a sensor connected with the chip; and sending voltage frequency scaling information to the chip according to the working state information or the application scenario information of the chip, in which the voltage frequency scaling information may be configured to instruct the chip to scale its working voltage or working frequency.

An embodiment of the application, the working state information of the chip may include an operating speed of the chip, the voltage frequency scaling information may include first voltage frequency scaling information, and sending the voltage frequency scaling information to the chip according to the working state information or the application scenario information of the chip may include that:

if the operating speed of the chip is greater than a target speed, sending the first voltage frequency scaling information to the chip, in which the first voltage frequency scaling information may be configured to instruct the chip to decrease its working frequency or working voltage and the target speed may be an operating speed of the chip if a user requirement is met.

An embodiment of the application, the chip may include at least a first unit and a second unit. Output data of the first unit is input data of the second unit. The working state information of the chip may include an operating speed of the first unit and an operating speed of the second unit. The voltage frequency scaling information may include second voltage frequency scaling information. The sending the voltage frequency scaling information to the chip according to the working state information or the application scenario information of the chip may further include:

if a running time of the first unit exceeds a running time of the second unit according to a running speed of the first unit and a running speed of the second unit, sending the second voltage frequency scaling information to the second unit, in which the second voltage frequency scaling information may be configured to instruct the second unit to decrease its working frequency or working voltage.

An embodiment of the application, the voltage frequency scaling information may include third voltage frequency scaling information, and sending the voltage frequency scaling information to the chip according to the working state information or the application scenario information of the chip may further include:

if a running time of the second unit exceeds a running time of the first unit according to a running speed of the first unit and a running speed of the second unit, sending the third voltage frequency scaling information to the first unit, in which the third voltage frequency scaling information may be configured to instruct the first unit to decrease its working frequency or working voltage.

An embodiment of the application, the chip may include at least N units, the working state information of the chip may include working state information of at least S units in the at least N units, in which N may be an integer larger than 1 and S may be an integer less than or equal to N. The voltage frequency scaling information may include fourth voltage frequency scaling information, and sending the voltage frequency scaling information to the chip according to the working state information or the application scenario information of the chip may further include:

according to the working state information of a unit A, in response to the unit A being determined to be in an idle state, sending the fourth voltage frequency scaling information to the unit A, in which the fourth voltage frequency scaling information may be configured to instruct the unit A to decrease its working frequency or working voltage, where the unit A is any one of the at least S units.

An embodiment of the application, the voltage frequency scaling information may include fifth voltage frequency scaling information, and sending the voltage frequency scaling information to the chip according to the working state information or the application scenario information of the chip may further include that:

according to the working state information of the unit A, in response to the unit A being determined to return to a working state, sending the fifth voltage frequency scaling information to the unit A, in which the fifth voltage frequency scaling information may be configured to instruct the unit A to increase its working voltage or working frequency.

An embodiment of the application, an application scenario of the chip is image recognition, the application scenario information is the count of objects in an image to be recognized, the voltage frequency scaling information may include sixth voltage frequency scaling information, and sending the voltage frequency scaling information to the chip according to the working state information or the application scenario information of the chip may further include:

in response to the count of the objects in the image to be recognized being determined to be less than a first threshold value, sending the sixth voltage frequency scaling information to the chip, in which the sixth voltage frequency scaling information may be configured to instruct the chip to decrease its working voltage or working frequency.

An embodiment of the application, the application scenario information is object tag information, the voltage frequency scaling information may include seventh voltage frequency scaling information, and sending the voltage frequency scaling information to the chip according to the working state information or the application scenario information of the chip may further include:

in response to the object tag information being determined to belong to a preset object tag set, sending the seventh voltage frequency scaling information to the chip, in which the seventh voltage frequency scaling information may be configured to instruct the chip to increase its working voltage or working frequency.

An embodiment of the application, the chip is applied to voice recognition, the application scenario information is a voice input rate, the voltage frequency scaling information may include eighth voltage frequency scaling information, and sending the voltage frequency scaling information to the chip according to the working state information or the application scenario information of the chip may further include:

if the voice input rate is lower than a second threshold value, sending the eighth voltage frequency scaling information to the chip, in which the eighth voltage frequency scaling information may be configured to instruct the chip to decrease its working voltage or working frequency.

An embodiment of the application, the application scenario information is a keyword obtained by voice recognition performed by the chip, the voltage frequency scaling information may include ninth voltage frequency scaling information, and sending the voltage frequency scaling information to the chip according to the working state information or the application scenario information of the chip may further include:

if the keyword belongs to a preset keyword set, sending the ninth voltage frequency scaling information to the chip, in which the ninth voltage frequency scaling information may be configured to instruct the chip to increase its working voltage or working frequency.

An embodiment of the application, the chip is applied to machine translation, the application scenario information is a character input speed or a number of characters in an image to be translated, the voltage frequency scaling information may include tenth voltage frequency scaling information, and sending the voltage frequency scaling information to the chip according to the working state information or the application scenario information of the chip may further include:

if the character input speed is lower than a third threshold value or the count of the characters in the image to be translated is less than a fourth threshold value, sending the tenth voltage frequency scaling information to the chip, in which the tenth voltage frequency scaling information may be configured to instruct the chip to decrease its working voltage or working frequency.

An embodiment of the application, the application scenario information is an external light intensity, the voltage frequency scaling information may include eleventh voltage frequency scaling information, and sending the voltage frequency scaling information to the chip according to the working state information or the application scenario information of the chip may further include:

if the external light intensity is lower than a fifth threshold value, sending the eleventh voltage frequency scaling information to the chip, in which the eleventh voltage frequency scaling information may be configured to instruct the chip to decrease its working voltage or working frequency.

An embodiment of the application, the chip is applied to image retouching, the voltage frequency scaling information may include twelfth voltage frequency scaling information and thirteenth voltage frequency scaling information, and sending the voltage frequency scaling information to the chip according to the working state information or the application scenario information of the chip may further include:

if the application scenario information is a face image, sending the twelfth voltage frequency scaling information to the chip, in which the twelfth voltage frequency scaling information may be configured to instruct the chip to decrease its working voltage, and if the application scenario information is not a face image, sending the thirteenth voltage frequency scaling information to the chip, in which the thirteenth voltage frequency scaling information may be configured to instruct the chip to decrease its working voltage or working frequency.

It can be seen that, according to the embodiments of the application, the DVFS device acquires the working state information of the chip connected thereto and each unit in the chip or the application scenario information of the chip in real time, and scales the working frequency or working voltage of the chip or each unit therein according to the working state information of the chip and each unit therein or the application scenario information of the chip, so as to reduce the overall running power consumption of the chip.

DETAILED DESCRIPTION OF THE EMBODIMENTS

In order to make the purpose, technical solutions and advantages of the disclosure clearer, the disclosure will further be described below in combination with specific embodiments and with reference to the drawings in detail.

Figure 1:
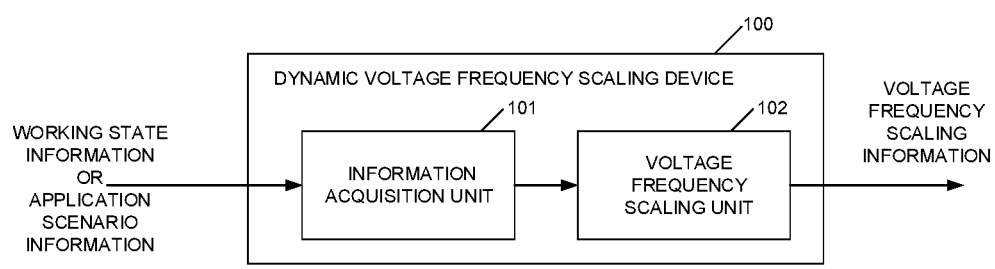
FIG. 1 is a schematic structure diagram of a DVFS device according to an embodiment of the application.

FIG. 1 is a schematic structure diagram of a DVFS device 100 according to an embodiment of the application. As shown in FIG. 1, the DVFS device 100 may include an information acquisition unit 101 and a voltage frequency scaling unit 102.

The information acquisition unit 101 may be configured to acquire working state information or application scenario information of a chip connected with the DVFS device in real time, in which the application scenario information may be information obtained by the chip through neural network computation or acquired by a sensor connected with the chip.

The voltage frequency scaling unit 102 may be configured to send voltage frequency scaling information to the chip according to the working state information or application scenario information of the chip, in which the voltage frequency scaling information may be configured to instruct the chip to scale its working voltage or working frequency.

An embodiment of the application, the working state information of the chip may include an operating speed of the chip, and the voltage frequency scaling information may include first voltage frequency scaling information. The voltage frequency scaling unit 102 may be configured to:

if the operating speed of the chip is greater than a target speed, send the first voltage frequency scaling information to the chip, in which the first voltage frequency scaling information may be configured to instruct the chip to decrease its working frequency or working voltage and the target speed may be an operating speed of the chip if a user requirement is met.

In one implementation, the information acquisition unit 101 may be configured to acquire the operating speed of the chip connected thereto in real time. The operating speed of the chip may be different types of speeds according to different tasks performed by the chip. If an operation performed by the chip is video image processing, the operating speed of the chip may be a frame rate for video image processing of the chip. If the operation performed by the chip is voice recognition, the operating speed of the chip is a speed for voice recognition of the chip. In response to determining that the operating speed of the chip is greater than the target speed, in other words, the operating speed of the chip reaches the operating speed of the chip if the user requirement is met, the voltage frequency scaling unit 102 sends the first voltage frequency scaling information to the chip to instruct the chip to decrease its working voltage or working frequency to reduce power consumption of the chip.

For example, assume that the operation performed by the chip is video image processing and the target speed is 24 frames/second. The information acquisition unit acquires the frame rate for video image processing of the chip in real time. A present frame rate for video image processing of the chip is 54 frames/seconds. In response to determining that the present frame rate for video image processing of the chip is higher than the target speed, the voltage frequency scaling unit sends the first voltage frequency scaling information to the chip to instruct the chip to decrease its working voltage or working frequency to reduce the power consumption of the chip.

An embodiment of the application, the chip may include at least a first unit and a second unit. Output data of the first unit is input data of the second unit. The working state information of the chip may include an operating speed of the first unit and an operating speed of the second unit. The voltage frequency scaling information may include second voltage frequency scaling information. The voltage frequency scaling unit 102 is further configured to:

in response to determining, according to the operating speed of the first unit and the operating speed of the second unit, that a running time of the first unit exceeds a running time of the second unit, send the second voltage frequency scaling information to the second unit, in which the second voltage frequency scaling information may be configured to instruct the second unit to decrease its working frequency or working voltage.

In one implementation, the abovementioned task performing of the chip requires cooperation of the first unit and the second unit. The output data of the first unit is the input data of the second unit. The information acquisition unit 101 acquires the operating speeds of the first unit and the second unit in real time. In response to determining that the operating speed of the first unit is lower than the operating speed of the second unit, in other words, the running time of the first unit exceeds the running time of the second unit, the voltage frequency scaling unit 102 sends the second voltage frequency scaling information to the second unit to instruct the second unit to decrease its working voltage or working frequency to reduce the overall power consumption of the chip on the premise of no influence on the overall operating speed of the chip.

An embodiment of the application, the voltage frequency scaling information may include third voltage frequency scaling information, and the voltage frequency scaling unit 102 is further configured to:

in response to determining, according to the operating speed of the first unit and the operating speed of the second unit, that the running time of the second unit exceeds the running time of the first unit, send the third voltage frequency scaling information to the first unit, in which the third voltage frequency scaling information may be configured to instruct the first unit to decrease its working frequency or working voltage.

An embodiment of the application, the chip may include at least N units, the working state information of the chip may include working state information of at least S units in the at least N units, in which N may be an integer larger than one and S may be an integer less than or equal to N, and the voltage frequency scaling information may include fourth voltage frequency scaling information. The voltage frequency scaling unit 102 may be configured to:

in response to determining, according to the working state information of a unit A, that the unit A is in an idle state, send the fourth voltage frequency scaling information to the unit A, in which the fourth voltage frequency scaling information may be configured to instruct the unit A to decrease its working frequency or working voltage.

The unit A is any one of the at least S units.

An embodiment of the application, the voltage frequency scaling information may include fifth voltage frequency scaling information, and the voltage frequency scaling unit 102 is further configured to:

in response to determining, according to the working state information of the unit A, that the unit A returns to a working state, send the fifth voltage frequency scaling information to the unit A, in which the fifth voltage frequency scaling information may be configured to instruct the unit A to increase its working voltage or working frequency.

In one implementation, in a working process of the chip, the information acquisition unit 101 acquires the working state information of the at least S units in the chip in real time. In response to determining, according to the working state information of the unit A, that the unit A is in the idle state, the voltage frequency scaling unit 102 sends the fourth voltage frequency scaling information to the unit A to instruct the unit A to decrease its working frequency or working voltage to reduce power consumption of the unit A. In response to determining, according to the working state information of the unit A, that the unit A returns to the working state, the voltage frequency scaling unit 102 sends the fifth voltage frequency scaling information to the unit A to instruct the unit A to increase its working frequency or working voltage, so as to enable an operating speed of the unit A to meet a working requirement.

An embodiment of the application, an application scenario of the chip may be image recognition. The application scenario information may include the count of objects in an image to be recognized, the voltage frequency scaling information may include sixth voltage frequency scaling information, and the voltage frequency scaling unit 102 is further configured to:

in response to determining that the count of the objects in the image to be recognized is less than a first threshold value, send the sixth voltage frequency scaling information to the chip, in which the sixth voltage frequency scaling information may be configured to instruct the chip to decrease its working voltage or working frequency.

In one implementation, the chip is applied to image recognition. The count of the objects in the image to be recognized is obtained by the chip through a neural network algorithm. After the information acquisition unit 101 acquires the count of the objects in the image to be recognized (for example, the application scenario information) from the chip, in response to determining, by the voltage frequency scaling unit 102, that the count of the objects in the image to be recognized is less than the first threshold value, the voltage frequency scaling unit 102 sends the sixth voltage frequency scaling information to the chip to instruct the chip to decrease its working voltage or working frequency. In response to determining that the count of the objects in the image to be recognized is larger than the first threshold value, the voltage frequency scaling unit 102 sends the voltage frequency scaling information configured to instruct the chip to increase its working voltage or working frequency to the chip.

An embodiment of the application, the application scenario information may be object tag information. The voltage frequency scaling information may include seventh voltage frequency scaling information, and the voltage frequency scaling unit 102 is further configured to:

in response to determining that the object tag information belongs to a preset object tag set, send the seventh voltage frequency scaling information to the chip, in which the seventh voltage frequency scaling information may be configured to instruct the chip to increase its working voltage or working frequency.

For example, the preset object tag set may include multiple object tags. The object tag may be "human", "dog", "tree", and "flower". If the chip determines, through the neural network algorithm, that a present application scenario may include a dog, the chip transfers object tag information including the "dog" to the information acquisition unit 101; the voltage frequency scaling unit 102, in response to determining that the object tag information may include the "dog", sends the seventh voltage frequency scaling information to the chip to instruct the chip to increase its working voltage or working frequency. In response to determining that the object tag information does not belong to the preset object tag set, the voltage frequency scaling unit 102 sends voltage frequency scaling information configured to instruct the chip to decrease its working voltage or working frequency to the chip.

An embodiment of the application, the chip is applied to voice recognition. The application scenario information may be a voice input rate, the voltage frequency scaling information may include eighth voltage frequency scaling information, and the voltage frequency scaling unit is further configured to:

if the voice input rate is lower than a second threshold value, send the eighth voltage frequency scaling information to the chip, in which the eighth voltage frequency scaling information may be configured to instruct the chip to decrease its working voltage or working frequency.

In one implementation, the application scenario of the chip is voice recognition and an input unit of the chip inputs a voice to the chip at a certain rate. The information acquisition unit 101 acquires the voice input rate in real time and transfers voice input rate information to the voltage frequency scaling unit 102. In response to determining that the voice input rate is lower than the second threshold value, the voltage frequency scaling unit 102 sends the eighth voltage frequency scaling information to the chip to instruct the chip to decrease its working voltage or working frequency. In response to determining that the voice input rate is higher than the second threshold value, the voltage frequency scaling unit 102 sends the voltage frequency scaling information configured to instruct the chip to increase its working voltage or working frequency to the chip.

An embodiment of the application, the application scenario information may be a keyword obtained by voice recognition performed by the chip, the voltage frequency scaling information may include ninth voltage frequency scaling information, and the voltage frequency scaling unit is further configured to:

if the keyword belongs to a preset keyword set, send the ninth voltage frequency scaling information to the chip, in which the ninth voltage frequency scaling information may be configured to instruct the chip to increase its working voltage or working frequency.

Furthermore, if the keyword does not belong to the keyword set, the voltage frequency scaling unit 102 sends voltage frequency scaling information configured to instruct the chip to decrease its working voltage or working frequency to the chip.

For example, the application scenario of the chip is voice recognition. The preset keyword set may include keywords such as "image retouching", "neural network algorithm", "image processing", "Alipay", and the like. If the application scenario information is "image retouching", the voltage frequency scaling unit 102 sends the ninth voltage frequency scaling information to instruct the chip to increase its working voltage or working frequency. If the application scenario information is "photographing", the voltage frequency scaling unit 102 sends voltage frequency scaling information configured to indicate the chip to decrease its working voltage or working frequency to the chip.

An embodiment of the application, the chip is applied to machine translation, the application scenario information may include a character input speed or the count of characters in an image to be translated, the voltage frequency scaling information may include tenth voltage frequency scaling information, and the voltage frequency scaling unit is further configured to:

if the character input speed is lower than a third threshold value or the count of the characters in the image to be translated is less than a fourth threshold value, send the tenth voltage frequency scaling information to the chip, in which the tenth voltage frequency scaling information may be configured to instruct the chip to decrease its working voltage or working frequency.

In one implementation, the chip is applied to machine translation. The application scenario information acquired by the information acquisition unit 101 is the character input speed or the count of the characters in the image to be translated, and the application scenario information is transferred to the voltage frequency scaling unit 102. In response to determining that the character input speed is lower than the third threshold value or the count of the characters in the image to be translated is less than the fourth threshold value, the voltage frequency scaling unit 102 sends the tenth voltage frequency scaling information to the chip to instruct the chip to decrease its working voltage. In response to determining that the character input speed is greater than the third threshold value or the count of the characters in the image to be translated is larger than the fourth threshold value, the voltage frequency scaling unit 102 sends voltage frequency scaling information configured to instruct the chip to increase its working voltage to the chip.

An embodiment of the application, the application scenario information is an external light intensity, the voltage frequency scaling information may include eleventh voltage frequency scaling information, and the voltage frequency scaling unit is further configured to:

if the external light intensity is lower than a fifth threshold value, send the eleventh voltage frequency scaling information to the chip, in which the eleventh voltage frequency scaling information may be configured to instruct the chip to decrease its working voltage or working frequency.

In one implementation, the external light intensity is acquired by a light sensor connected with the chip. After acquiring the light intensity, the information acquisition unit 101 transfers the light intensity to the voltage frequency scaling unit 102. In response to determining that the light intensity is lower than the fifth threshold value, the voltage frequency scaling unit 102 sends the eleventh voltage frequency scaling information to the chip to instruct the chip to decrease its working voltage. In response to determining that the light intensity is higher than the fifth threshold value, the voltage frequency scaling unit 102 sends the voltage frequency scaling information configured to instruct the chip to increase its working voltage or working frequency to the chip.

An embodiment of the application, the chip is applied to image retouching, the voltage frequency scaling information may include twelfth voltage frequency scaling information and thirteenth voltage frequency scaling information, and the voltage frequency scaling unit is further configured to:

if the application scenario information is a face image, send the twelfth voltage frequency scaling information to the chip, in which the twelfth voltage frequency scaling information may be configured to instruct the chip to increase its working voltage or working frequency, and if the application scenario information is not a face image, send the thirteenth voltage frequency scaling information to the chip, in which the thirteenth voltage frequency scaling information may be configured to instruct the chip to decrease its working voltage or working frequency.

An embodiment of the application, the chip is applied to voice recognition and the application scenario information is a voice intensity. If the voice intensity is higher than a sixth threshold value, the voltage frequency scaling unit 102 sends voltage frequency scaling information configured to instruct the chip to decrease its working voltage or working frequency to the chip. If the voice intensity is lower than the sixth threshold value, the voltage frequency scaling unit 102 sends voltage frequency scaling information configured to instruct the chip to increase its working voltage or working frequency to the chip.

It is to be noted that the scenario information may be external scenario information, for example, the light intensity and the voice intensity, acquired by a sensor. The application scenario information may also be information computed according to an artificial intelligence algorithm. For example, in an object recognition task, real-time computation result information of the chip is fed back to the information acquisition unit. The information may include information such as the count of objects, a face image, and an object tag keyword in a scenario.

In one implementation, the artificial intelligence algorithm may include, but is not limited to, a neural network algorithm.

It can be seen that, according to the embodiments of the application, the DVFS device acquires the working state information of the chip connected thereto and each unit in the chip or the application scenario information of the chip in real time, and scales the working frequency or working voltage of the chip or each unit therein according to the working state information of the chip and each unit therein or the application scenario information of the chip, so as to reduce the overall running power consumption of the chip.

Figure 2:
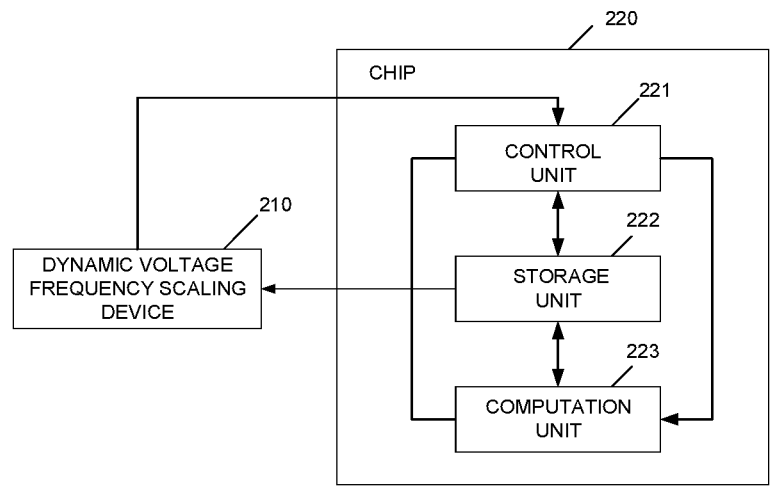
FIG. 2 is a schematic diagram of a DVFS application scenario according to an embodiment of the application.

FIG. 2 is a schematic diagram of a DVFS application scenario according to an embodiment of the application. As shown in FIG. 2, a convolutional computation device may include a DVFS device 210 and a chip 220 connected with the DVFS device.

The chip 220 may include a control unit 221, a storage unit 222, and a computation unit 223. The chip 220 may be configured for tasks of image processing, voice processing, and the like.

The DVFS device 210 acquires working state information of the chip 220 in real time. The working state information of the chip 220 may include an operating speed of the chip 220, an operating speed of the control unit 221, an operating speed of the storage unit 222, and an operating speed of the computation unit 223.

An embodiment of the application, if the chip 220 performs a task, if the DVFS device 210 determines, according to the operating speed of the storage unit 222 and the operating speed of the computation unit 223, that a running time of the storage unit 222 exceeds a running time of the computation unit 223, the DVFS device 210 may determine that the storage unit 222 becomes a bottleneck in this task performing process. After the computation unit 223 completes performing a present computational operation, the computation unit 223 may perform a computational operation according to data transferred by the storage unit 222 this time only after the storage unit 222 completes performing a reading task and transfers the read data to the computation unit 223. The DVFS device 210 sends first voltage frequency scaling information to the computation unit 223, in which the first voltage frequency scaling information may be configured to instruct the computation unit 223 to decrease its working voltage or working frequency, so as to reduce the operating speed of the computation unit 223, thereby reducing overall running power consumption of the chip 220 under the condition of no influence on a completion time of the task.

An embodiment of the application, if the chip 220 performs a task, if the DVFS device 210 determines, according to the operating speed of the storage unit 222 and the operating speed of the computation unit 223, that the running time of the storage unit 222 is shorter than the running time of the computation unit 223, the DVFS device 210 may determine that the computation unit 223 becomes a bottleneck in this task performing process. If the computation unit 223 has yet not completed a present computational operation after the storage unit 222 completes reading data, the storage unit 222 may transfer the read data to the computation unit 223 only after the computation unit 223 completes the present computational operation. The DVFS device 210 sends second voltage frequency scaling information to the storage unit 222, in which the second voltage frequency scaling information may be configured to instruct the storage unit 222 to decrease its working voltage or working frequency, so as to reduce the operating speed of the storage unit 222, thereby reducing the overall running power consumption of the chip 220 under the condition of no influence on a completion time of the task.

An embodiment of the application, the DVFS device 210 acquires the operating speed of the chip 220 in real time. In response to determining, by the DVFS device 210, that the operating speed of the chip 220 is greater than a target operating speed, the target operating speed being an operating speed capable of meeting a user requirement, the DVFS device 210 sends third voltage frequency scaling information to the chip 220, in which the third voltage frequency scaling information may be configured to instruct the chip 220 to decrease its working voltage or working frequency so as to reduce the running power consumption of the chip 220.

In one implementation, the chip 220 may be applied to video processing. For example, a user requires that a frame rate for video processing is not lower than 30 frames/second under a normal condition. Assuming that a practical frame rate for video processing of the chip 220 is 100 frames/second in such case, the DVFS device sends voltage frequency scaling information to the chip 220, in which the voltage frequency scaling information may be configured to instruct the chip 220 to decrease its working voltage or working frequency so as to decrease the frame rate for video processing to be about 30 frames/second.

An embodiment of the application, the DVFS device 210 monitors a working state of each of units (including the control unit 221, the storage unit 222, and the computation unit 223) in the chip 220 in real time. In response to determining that any of the units is in an idle state, the DVFS device 220 sends fourth voltage frequency scaling information to the unit, in which the fourth voltage frequency scaling information may be configured to indicate a working voltage or working frequency of the unit to be decreased, thereby reducing the power consumption of the chip 220. If the unit returns to a working state, the DVFS device 210 sends fifth voltage frequency scaling information to the unit to increase the working voltage or working frequency of the unit, so as to enable the operating speed of the unit to meet a working requirement. It can be seen that, according to embodiments of the application, the DVFS device 210 acquires operating speed information of the chip and each unit therein in real time, and decreases the working frequency or working voltage of the chip or each unit therein according to the operating speed information, so as to reduce the overall running power consumption of the chip.

Figure 3:
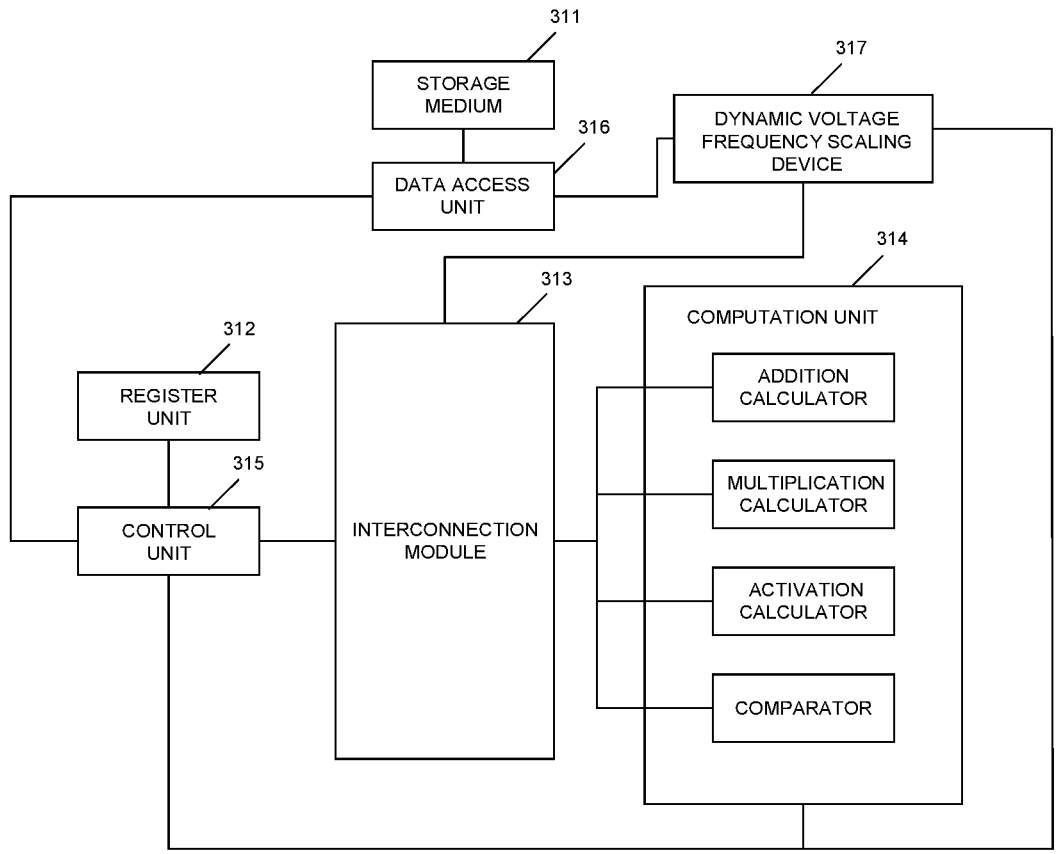
FIG. 3 is a schematic diagram of another DVFS application scenario according to an embodiment of the application.

FIG. 3 is a schematic diagram of another DVFS application scenario according to an embodiment of the application. As shown in FIG. 3, a convolutional computation device may include a DVFS device 317, a register unit 312, an interconnection module 313, a computation unit 314, a control unit 315, and a data access unit 316.

The computation unit 314 may include at least two of calculators including an addition calculator, a multiplication calculator, a comparator, and an activation calculator.

The interconnection module 313 may be configured to control a connection relationship of the calculators in the computation unit 314 to enable the at least two calculators to form different computation topological structures.

The register unit 312 (which may be a register unit, an instruction cache, and a scratch pad memory) may be configured to store a computational instruction, an address of a data block in the storage medium, and the computation topological structure corresponding to the computational instruction.

In one implementation, the convolutional computation device further may include a storage medium 311.

The storage medium 311 may be an off-chip memory, of course, may also be an on-chip memory during a practical application, and may be configured to store the data block. The data block may be n-dimensional data, in which n may be an integer more than or equal to one. For example, the data block is one-dimensional data, for example, a vector, if n=1; the data block is two-dimensional data, for example, a matrix, if n=2; and the data block is multidimensional data if n≥3.

The control unit 315 may be configured to extract the computational instruction, an operation field corresponding to the computational instruction, and a first computation topological structure corresponding to the computational instruction from the register unit 312, to decode the computational instruction into an performing instruction, in which the performing instruction may be configured to control the computation unit 314 to perform a computational operation, to transfer the operation field to the data access unit 316, and to transfer the computation topological structure to the interconnection module 313.

The data access unit 316 may be configured to extract the data block corresponding to the operation field from the storage medium 311 and to transfer the data block to the interconnection module 313.

The interconnection module 313 may be configured to receive the data block of the first computation topological structure.

An embodiment of the application, the interconnection module 313 is further configured to replace the data block according to the first computation topological structure.

The computation unit 314 may be configured to call the calculator of the computation unit 314 to perform the computational operation on the data block to obtain a computational result according to the performing instruction, to transfer the computational result to the data access unit 316, and to store it in the storage medium 312.

An embodiment of the application, the computation unit 314 may be further configured to call the calculator to perform a computational operation on the replaced data block to obtain a computational result according to the first computation topological structure and the performing instruction, to transfer the computational result to the data access unit 316, and to store it in the storage medium 312.

An embodiment, the interconnection module 313 may be further configured to control the connection relationship of the calculators in the computation unit 314 to form the first computation topological structure.

The DVFS device 317 may be configured to monitor a working state of the whole convolutional computation device and to dynamically scale a voltage and a frequency of the whole convolutional computation device.

A computation method for the convolutional computation device will be described with different computational instructions below according to an implementation of the application. The computational instruction is, for example, a convolutional computation instruction. The convolutional computation instruction may be applied to a neural network. Thus, the convolutional computation instruction may also be called a convolutional neural network instruction. For the convolutional computation instruction, a formula practically required to be performed may be:

$$s=s(\Sigma w\chi_i+b)$$

The formula represents that a convolutional kernel W (which may include multiple pieces of data) is multiplied by input data $\chi_i$, and a sum is computed. Then, an offset b may be added. Then, activation computation s(h) may further be performed to obtain a final output result S. The following computation topological structure may be obtained according to the formula: multiplication calculator-addition calculator-(optionally) activation calculator. The convolutional computation instruction may be included in an instruction set. The instruction set may include convolutional neural network COMPUTE instructions with different functions, a CONFIG instruction, an IO instruction, a NOOperation (NOP) instruction, a jump instruction, and a MOVE instruction.

In an embodiment, the COMPUTE instructions include the following instructions.

A convolutional computation instruction: according to the instruction, the convolutional computation device extracts, from specified addresses of the memory (which may be a scratch pad memory or a scalar register file), input data with a specified size and a convolutional kernel respectively, and performs a convolutional operation in a convolutional computation component.

A convolutional neural network sigmoid instruction: according to the instruction, the convolutional computation device extracts, from specified addresses of the memory (which may be a scratch pad memory or a scalar register file), input data with a specified size and a convolutional kernel respectively, performs a convolutional operation in a convolutional computation component, and performs sigmoid activation on an output result.

A convolutional neural network tan h instruction: according to the instruction, the convolutional computation device extracts, from specified addresses of the memory (which may be a scratch pad memory), input data with a specified size and a convolutional kernel respectively, performs a convolutional operation in a convolutional computation component, and performs tan h activation on an output result.

A convolutional neural network ReLU instruction: according to the instruction, the convolutional computation device extracts, from specified addresses of the memory (which may be a scratch pad memory), input data with a specified size and a convolutional kernel respectively, performs a convolutional operation in a convolutional computation component, and performs ReLU activation on an output result.

A convolutional neural network group instruction: according to the instruction, the convolutional computation device extracts, from specified addresses of the memory (which may be a scratch pad memory), input data with a specified size and a convolutional kernel respectively, performs a convolutional operation in a convolutional computation component after grouping, and activates an output result.

The CONFIG instruction may be configured to configure various constants required by computation of a present layer before computation of each layer of an artificial neural network is started.

The IO instruction may be configured to read in input data required by computation from an external storage space and to store the data back into the external space after computation is completed.

The NOP instruction may be configured to clear present control signals in all control signal cache queues in the convolutional computation device to ensure that all instructions before the NOP instruction are performed. The NOP instruction does not include any operation.

The jump instruction may be configured to control jump of an address of a next instruction to be read by the instruction storage unit so as to implement jump of a control flow.

The move instruction may be configured to move data at a certain address of an internal address space of the convolutional computation device to another address of the internal address space of the convolutional computation device. The process is independent from the computation unit, with no resource of the computation unit occupied during performing.

A method by which the convolutional computation device performs the convolutional computation instruction may be as follows.

The control unit 315 extracts the convolutional computation instruction, an operation field corresponding to the convolutional computation instruction, and a first computation topological structure corresponding to the convolutional computation instruction (multiplication calculator-addition calculator-addition calculator-activation calculator) from the register unit 312. The control unit transfers the operation field to the data access unit 316 and transfers the first computation topological structure to the interconnection module 313.

The data access unit 316 extracts a convolutional kernel w, which corresponds to the operation field, and the offset b (if b is equal to zero, the offset b is not required to be extracted) from the storage medium 311, and transfers the convolutional kernel w and the offset b to the computation unit 314.

The multiplication calculator of the computation unit 314 performs a multiplication computation on the convolutional kernel w and input data Xi to obtain a first result, inputs the first result to the addition calculator, and performs addition computation to obtain a second result. The multiplication calculator performs addition computation on the second result and the offset b to obtain a third result, transfers the third result to the activation calculator, and performs activation computation to obtain an output result S. The output result S is transferred to the data access unit 316 for storage in the storage medium. In one implementation, after each operation, an output result of each operation may directly be transferred to the data access unit 316 for storage in the storage medium without waiting for performing of the next operations. In addition, the operation that the multiplication calculator performs addition computation on the second result and the offset b to obtain a third result is optional, in other words, if b is equal to zero, the operation is not required. Moreover, a sequence of the addition computation and the multiplication computation may be exchanged.

In one implementation, the first result may include multiple multiplication computational results.

An embodiment of the application, an embodiment of the application provides a neural network processor, which may include the abovementioned convolutional computation device.

The neural network processor may be configured to perform artificial neural network computation so as to implement artificial intelligence applications of voice recognition, image recognition, translation, and the like.

In a convolutional computation task, a working process of the DVFS device 317 is as follows.

A first condition: in a convolutional computation performing process of the neural network processor, the DVFS device 317 acquires operating speeds of the data access unit 316 and computation unit 314 of the neural network processor in real time. If the DVFS device 317 determines, according to the operating speeds of the data access unit 316 and the computation unit 314, that a running time of the data access unit 316 exceeds a running time of the computation unit 314, the DVFS device 317 may determine that the data access unit 316 becomes a bottleneck in the convolutional computation process. After the computation unit 314 completes performing a present convolutional computational operation, the computation unit 314 may perform a convolutional computational operation according to data transferred by the data access unit 316 this time only after the data access unit 316 completes performing a reading task and transfers the read data to the computation unit 314. The DVFS device 317 sends first voltage frequency scaling information to the computation unit 314, in which the first voltage frequency scaling information may be configured to instruct the computation unit 314 to decrease its working voltage or working frequency, so as to reduce the operating speed of the computation unit 314 and make the operating speed of the computation unit 314 matched with the operating speed of the data access unit 316, which may reduce power consumption of the computation unit 314, avoid occurrence of the condition that the computation unit 314 is idle, and finally reduce overall running power consumption of the neural network processor under the condition of no influence on a completion time of the task.

A second condition: in the convolutional computation performing process of the neural network processor, the DVFS device 317 acquires operating speeds of the data access unit 316 and computation unit 314 of the neural network processor in real time. If the DVFS device 317 determines, according to the operating speeds of the data access unit 316 and the computation unit 314, that the running time of the computation unit 314 exceeds the running time of the data access unit 316, the DVFS device 317 may determine that the computation unit 314 becomes a bottleneck in the convolutional computation process. After the data access unit 316 completes performing a present data reading operation, the data access unit 316 may transfer read data to the computation unit 314 only after the computation unit 314 performs a present convolutional computational operation. The DVFS device 317 sends second voltage frequency scaling information to the data access unit 316, in which the second voltage frequency scaling information may be configured to instruct the data access unit 316 to decrease its working voltage or working frequency, so as to reduce the operating speed of the data access unit 316 and make the operating speed of the data access unit 316 matched with the operating speed of the computation unit 314, which may reduce power consumption of the data access unit 316, avoid occurrence of the condition that the data access unit 316 is idle, and finally reduce the overall running power consumption of the neural network processor under the condition of no influence on the completion time of the task.

If the neural network processor performs artificial neural network computation for an artificial intelligence application, the DVFS device 317 acquires a working parameter for the artificial intelligence application of the neural network processor in real time and scales a working voltage or working frequency of the neural network processor according to the working parameter.

In one implementation, the artificial intelligence application may be video image processing, object recognition, machine translation, voice recognition, image retouching, and the like.

A third condition: if the neural network processor performs video image processing, the DVFS device 317 acquires a frame rate for video image processing of the neural network processor in real time. If the frame rate for video image processing exceeds a target frame rate, the target frame rate being a video image processing frame rate normally required by a user, the DVFS device 317 sends third voltage frequency scaling information to the neural network processor, in which the third voltage frequency scaling information may be configured to instruct the neural network processor to decrease its working voltage or working frequency, so as to meet a normal video image processing requirement of the user and simultaneously reduce the power consumption of the neural network processor.

A fourth condition: if the neural network processor performs voice recognition, the DVFS device 317 acquires a voice recognition speed of the neural network processor in real time. If the voice recognition speed of the neural network processor exceeds a practical voice recognition speed of the user, the DVFS device 317 sends fourth voltage frequency scaling information to the neural network processor, in which the fourth voltage frequency scaling information may be configured to instruct the neural network processor to decrease its working voltage or working frequency, so as to meet a normal voice recognition requirement of the user and simultaneously reduce the power consumption of the neural network processor.

A fifth condition: the DVFS device 317 monitors a working state of each unit or module (including the storage medium 311, the register unit 312, the interconnection module 313, the computation unit 314, the control unit 315, and the data access unit 316) in the neural network processor in real time. If any unit or module of the neural network processor is in an idle state, the DVFS device 317 sends fifth voltage frequency scaling information to the unit or module to decrease a working voltage or working frequency of the unit or the module to further reduce power consumption of the unit or the module. If the unit or the module returns to the working state, the DVFS device 317 sends sixth voltage frequency scaling information to the unit or the module to increase the working voltage or working frequency of the unit or the module, so as to enable an operating speed of the unit or the module to meet a working requirement.

Figure 4:
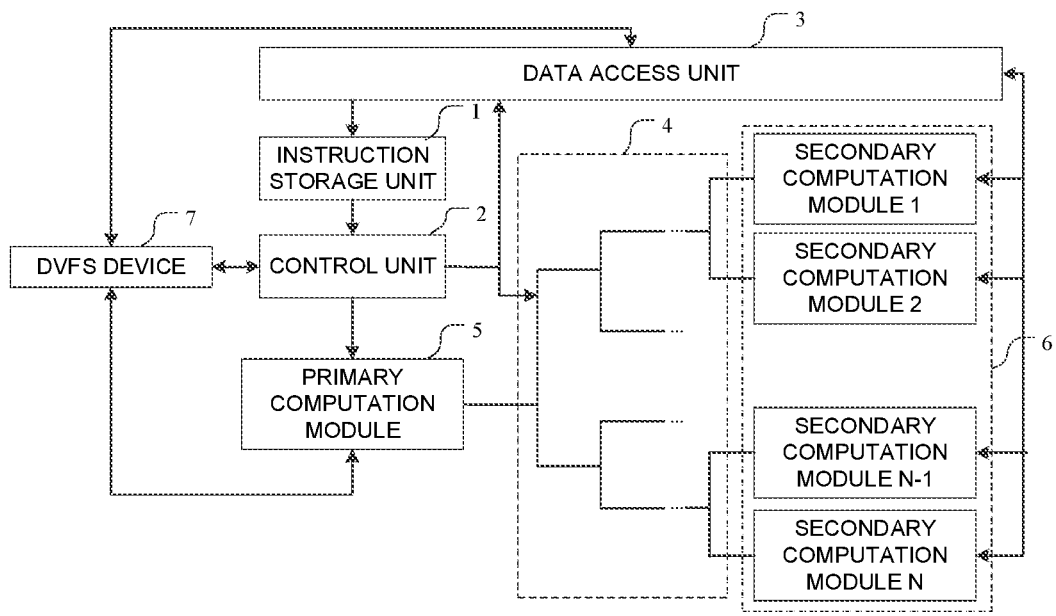
FIG. 4 is a schematic diagram of yet another DVFS application scenario according to an embodiment of the application.

FIG. 4 is a schematic diagram of another DVFS application scenario according to an embodiment of the application. As shown in FIG. 4, a convolutional computation device may include a DVFS device 7, an instruction storage unit 1, a control unit 2, a data access unit 3, an interconnection module 4, a primary computation module 5, and multiple secondary computation modules 6. All of the instruction storage unit 1, the control unit 2, the data access unit 3, the interconnection module 4, the primary computation module 5, and the secondary computation modules 6 may be implemented through a hardware circuit (for example, including, but not limited to, a field-programmable gate array (FPGA), a coarse grained reconfigurable architecture (CGRA), an application specific integrated circuit (ASIC), an analogue circuit, and a memristor).

The instruction storage unit 1 reads in an instruction through the data access unit 3 and stores the read-in instruction.

The control unit 2 reads the instruction from the instruction storage unit 1, decodes the instruction into a control signal for controlling an operation of another module, and sends it to the other module, for example, the data access unit 3, the primary computation module 5, and the secondary computation modules 6.

The data access unit 3 may access an external address space and directly read and write data from/into each unit in the convolutional computation device to complete data loading and storage.

The interconnection module 4 may be configured to connect the primary computation module and the secondary computation modules, and may implement different interconnection topologies (for example, a tree structure, a ring structure, a grid structure, a hierarchical interconnection, and a bus structure).

The DVFS device 7 may be configured to acquire working state information of the data access unit 3 and the primary computation module 5 in real time, and to scale working voltages or working frequencies of the data access unit 3 and the primary computation module 5 according to the working state information.

An embodiment of the application, an embodiment of the application provides a neural network processor, which may include the abovementioned convolutional computation device.

The neural network processor may be configured to perform artificial neural network computation so as to implement artificial intelligence applications of voice recognition, image recognition, translation, and the like.

In a convolutional computation task, a working process of the DVFS device 7 is as follows.

A first condition: in a convolutional computation performing process of the neural network processor, the DVFS device 7 acquires operating speeds of the data access unit 3 and primary computation module 5 of the neural network processor in real time. If the DVFS device 7 determines, according to the operating speeds of the data access unit 3 and the primary computation module 5, that a running time of the data access unit 3 exceeds a running time of the primary computation module 5, the DVFS device 7 may determine that the data access unit 3 becomes a bottleneck in the convolutional computation process. After the primary computation module 5 completes performing a present convolutional computational operation, the primary computation module 5 may perform a convolutional computational operation according to data transferred by the data access unit 3 this time only after the data access unit 3 completes performing a reading task and transfers the read data to the primary computation module 5. The DVFS device 7 sends first voltage frequency scaling information to the primary computation module 5, in which the first voltage frequency scaling information may be configured to instruct the primary computation module 5 to decrease its working voltage or working frequency, so as to reduce the operating speed of the primary computation module 5 and make the operating speed of the primary computation module 5 matched with the operating speed of the data access unit 3, which may reduce power consumption of the primary computation module 5, avoid occurrence of the condition that the primary computation module 5 is idle, and finally reduce overall running power consumption of the neural network processor under the condition of no influence on a completion time of the task.

A second condition: in the convolutional computation performing process of the neural network processor, the DVFS device 7 acquires operating speeds of the data access unit 3 and primary computation module 5 of the neural network processor in real time. If the DVFS device 3 determines, according to the operating speeds of the data access unit 3 and the primary computation module 5, that the running time of the primary computation module 5 exceeds the running time of the data access unit 3, the DVFS device 7 may determine that the primary computation module 5 becomes a bottleneck in the convolutional computation process. After the data access unit 3 completes performing a present data reading operation, the data access unit 3 may transfer read data to the primary computation module 5 only after the primary computation module 5 performs a present convolutional computational operation. The DVFS device 7 sends second voltage frequency scaling information to the data access unit 3, in which the second voltage frequency scaling information may be configured to instruct the data access unit 3 to decrease its working voltage or working frequency, so as to reduce the operating speed of the data access unit 3 and make the operating speed of the data access unit 3 matched with the operating speed of the primary computation module 5, which may reduce power consumption of the data access unit 3, avoid occurrence of the condition that the data access unit 3 is idle, and finally reduce the overall running power consumption of the neural network processor under the condition of no influence on the completion time of the task.

If the neural network processor performs artificial neural network computation for an artificial intelligence application, the DVFS device 7 acquires a working parameter for the artificial intelligence application of the neural network processor in real time and scales a working voltage or working frequency of the neural network processor according to the working parameter.

In one implementation, the artificial intelligence application may be video image processing, object recognition, machine translation, voice recognition, image retouching, and the like.

A third condition: if the neural network processor performs video image processing, the DVFS device 7 acquires a frame rate for video image processing of the neural network processor in real time. If the frame rate for video image processing exceeds a target frame rate, the target frame rate being a video image processing frame rate normally required by a user, the DVFS device 7 sends third voltage frequency scaling information to the neural network processor, in which the third voltage frequency scaling information may be configured to instruct the neural network processor to decrease its working voltage or working frequency, so as to meet a normal video image processing requirement of the user and simultaneously reduce the power consumption of the neural network processor.

A fourth condition: if the neural network processor performs voice recognition, the DVFS device 7 acquires a voice recognition speed of the neural network processor in real time. If the voice recognition speed of the neural network processor exceeds a practical voice recognition speed of the user, the DVFS device 7 sends fourth voltage frequency scaling information to the neural network processor, in which the fourth voltage frequency scaling information may be configured to instruct the neural network processor to decrease its working voltage or working frequency, so as to meet a normal voice recognition requirement of the user and simultaneously reduce the power consumption of the neural network processor.

A fifth condition: the DVFS device 7 monitors and acquires working state information of each unit or module (including the instruction storage unit 1, the control unit 2, the data access unit 3, the interconnection module 4, the primary computation module 5, and the secondary computation modules 6) in the neural network processor in real time. If any unit or module in each unit or module of the neural network processor is in an idle state, the DVFS device 7 sends fifth voltage frequency scaling information to the unit or module to decrease a working voltage or working frequency of the unit or the module to further reduce power consumption of the unit or the module. If the unit or the module returns to a working state, the DVFS device 7 sends sixth voltage frequency scaling information to the unit or the module to increase the working voltage or working frequency of the unit or the module to enable an operating speed of the unit or the module to meet a working requirement.

Figure 5:
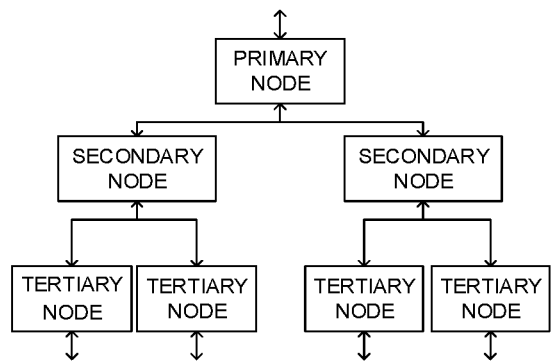
FIG. 5 is a schematic diagram of an implementation mode of an interconnection module 4 according to an embodiment of the application.

FIG. 5 schematically shows an implementation mode of the interconnection module 4: an H tree module. The interconnection module 4 forms data paths between the primary computation module 5 and the multiple secondary computation modules 6, with binary tree paths formed by multiple nodes. Each node sends data of an upstream to two nodes of a downstream, merges data returned by the two nodes of the downstream, and returns the data merged to the node of the upstream. For example, in a computation starting stage of a convolutional neural network, neuron data in the primary computation module 5 is sent to each secondary computation module 6 through the interconnection module 4. After a computation process of the secondary computation module 6 is completed, values of neurons output by each secondary computation module are spliced into a complete vector formed by neurons step by step in the interconnection module 4. For example, if there are totally N secondary computation modules in the device, input data xi is sent to the N secondary computation modules respectively, each secondary computation module performs convolutional computation on the input data xi and a convolutional kernel corresponding to the secondary computation module to obtain scalar data, and the interconnection module 4 merges the scalar data of each secondary computation module into an intermediate vector including N elements. If a convolutional window obtains totally A*B (A in an X direction and B in a Y direction, in which X and Y may be coordinate axes of a three-dimensional orthogonal coordinate system) pieces of input data xi by traversing, a convolutional operation is performed on the A*B pieces of xi, and all obtained vectors are merged in the primary computation module to obtain a three-dimensional intermediate result of A*B*N.

Figure 6:
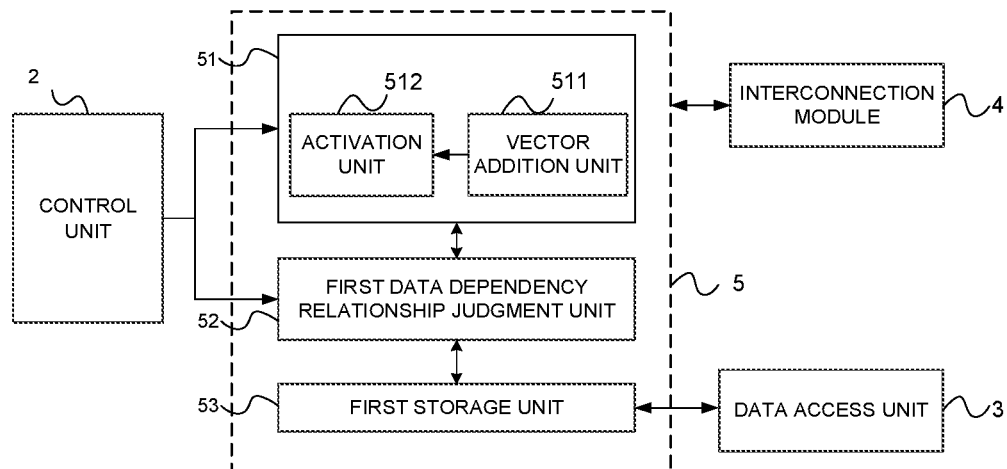
FIG. 6 is an exemplary structure block diagram of a primary computation module 5 in a device for performing convolutional neural network forward operation according to an embodiment of the application.

FIG. 6 is an exemplary structure block diagram of a primary computation module 5 in a device for performing convolutional neural network forward computation according to an embodiment of the application. As shown in FIG. 6, the primary computation module 5 may include a first computation unit 51, a first data dependency relationship judgment unit 52, and a first storage unit 53.

The first computation unit 51 may include a vector addition unit 511 and an activation unit 512. The first computation unit 51 may be configured to receive a control signal from the control unit 2 and to implement various computational functions of the primary computation module 5. The vector addition unit 511 may be configured to implement an offset addition operation for convolutional neural network forward computation, and to correspondingly add offset data and the intermediate result to obtain an offset result. The activation unit 512 may be configured to perform an active function operation on the offset result. The offset data may be read in from an external address space, and may also be locally stored.

The first data dependency relationship judgment unit 52 may be configured as a port through which the first computation unit 51 reads and writes the first storage unit 53, to ensure data read/write consistency of the first storage unit 53. In addition, the first data dependency relationship judgment unit 52 is also responsible for sending data read from the first storage unit 53 to the secondary computation modules 6 through the interconnection module 4. Output data of the secondary computation modules 6 is directly sent to the first computation unit 51 through the interconnection module 4. An instruction output by the control unit 2 is sent to the computation unit 51 and the first data dependency relationship judgment unit 52 to control their operations.

The storage unit 53 may be configured to cache input data and output data used by the primary computation module 5 in a computation process.

Figure 7:
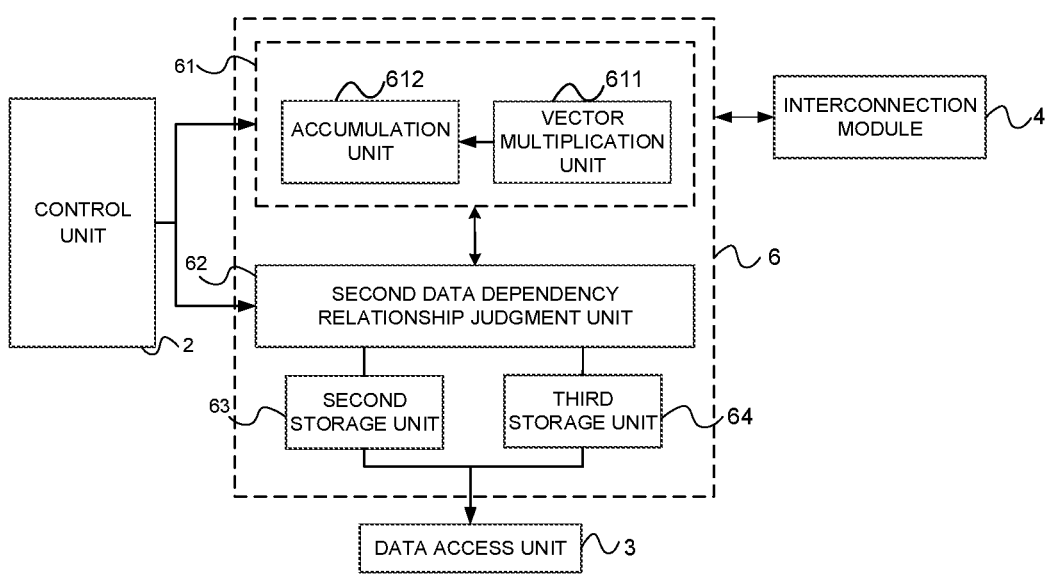
FIG. 7 is an exemplary structure block diagram of a secondary computation module 6 in a device for performing convolutional neural network forward operation according to an embodiment of the application.

FIG. 7 is an exemplary structure block diagram of a secondary computation module 6 in a device for performing convolutional neural network forward computation according to an embodiment of the application. As shown in FIG. 7, each secondary computation module 6 may include a second computation unit 61, a data dependency relationship judgment unit 62, a second storage unit 63, and a third storage unit 64.

The second computation unit 61 may be configured to receive the control signal sent by the control unit 2 and to perform a convolutional computation. The second computation unit may include a vector multiplication unit 611 responsible for vector multiplication computation and an accumulation unit 612 responsible for accumulation computation of the convolutional computation.

The second data dependency relationship judgment unit 62 is responsible for a read/write operation over the second storage unit 63 in the computation process. The second data dependency relationship judgment unit 62 may be configured to ensure that there is no read/write consistency conflict between data used for instructions before performing the read/write operation. For example, all control signals sent to the second data dependency relationship judgment unit 62 may be stored in an instruction queue of the second data dependency relationship judgment unit 62. In this queue, if a data reading range of a read instruction conflicts with a data writing range of a write instruction located in the front of the queue, the instruction may be performed only after the write instruction it depends on is performed.

The second storage unit 63 may be configured to cache input data and output scalar data of the secondary computation module 6.

The third storage unit 64 may be configured to cache convolutional kernel data required by the secondary computation module 6 in the computation process.

It can be seen that, according to the embodiments of the application, the DVFS device acquires the operating speeds of the neural network processor and each unit and module therein in real time and determines, according to the operating speeds of the neural network processor and each unit and module therein, to decrease the working frequency or working voltage of the neural network processor or each unit therein, so as to meet a requirement of a user during practical work and reduce the overall running power consumption of the chip.

Figure 8:
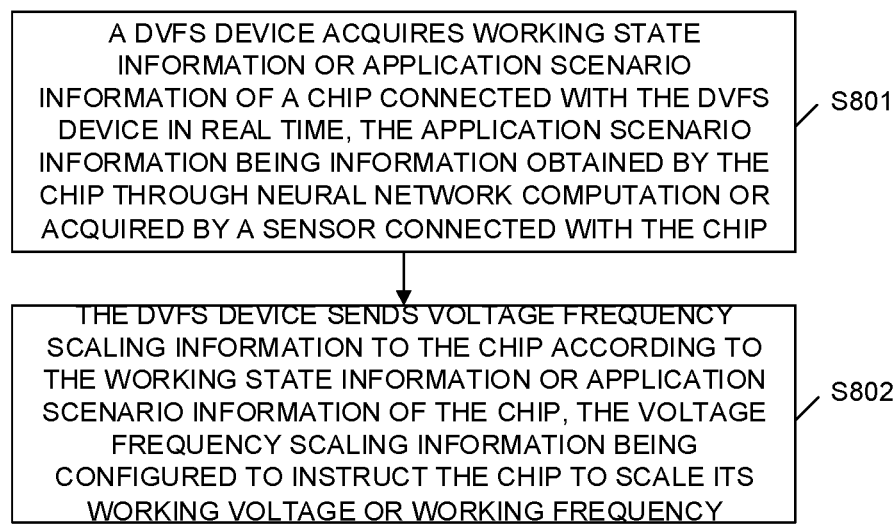
FIG. 8 is a schematic flowchart of a DVFS method according to an embodiment of the application.

FIG. 8 is a schematic flowchart of a DVFS method according to an embodiment of the application. As shown in FIG. 8, the method may include the following.

In S801, A DVFS device acquires working state information or application scenario information of a chip connected with the DVFS device in real time, in which the application scenario information may be information obtained by the chip through neural network computation or acquired by a sensor connected with the chip.

In S802, the DVFS device sends voltage frequency scaling information to the chip according to the working state information or application scenario information of the chip, in which the voltage frequency scaling information may be configured to instruct the chip to scale its working voltage or working frequency.

The working state information of the chip may include an operating speed of the chip, the voltage frequency scaling information may include first voltage frequency scaling information, and sending the voltage frequency scaling information to the chip according to the working state information or application scenario information of the chip may include:

if the operating speed of the chip is greater than a target speed, sending the first voltage frequency scaling information to the chip, in which the first voltage frequency scaling information may be configured to instruct the chip to decrease its working frequency or working voltage and the target speed may be an operating speed of the chip if a user requirement is met.

Furthermore, the chip may include at least a first unit and a second unit. Output data of the first unit is input data of the second unit. The working state information of the chip may include an operating speed of the first unit and an operating speed of the second unit. The voltage frequency scaling information may include second voltage frequency scaling information. Sending the voltage frequency scaling information to the chip according to the working state information or application scenario information of the chip further may include:

according to the operating speed of the first unit and the operating speed of the second unit, in response to a running time of the first unit being determined to exceed a running time of the second unit, sending the second voltage frequency scaling information to the second unit, in which the second voltage frequency scaling information may be configured to instruct the second unit to decrease its working frequency or working voltage.

Furthermore, the voltage frequency scaling information may include third voltage frequency scaling information, and sending the voltage frequency scaling information to the chip according to the working state information or application scenario information of the chip may further include:

according to the operating speed of the first unit and the operating speed of the second unit, in response to the running time of the second unit being determined to exceed the running time of the first unit, sending the third voltage frequency scaling information to the first unit, in which the third voltage frequency scaling information may be configured to instruct the first unit to decrease its working frequency or working voltage.

In one implementation, the chip may include at least N units, and the working state information of the chip may include working state information of at least S units in the N units, in which N may be an integer larger than one and S may be an integer less than or equal to N. The voltage frequency scaling information may include fourth voltage frequency scaling information, and sending the voltage frequency scaling information to the chip according to the working state information of the chip may further include:

according to the working state information of a unit A, in response to the unit A being determined to be in an idle state, sending the fourth voltage frequency scaling information to the unit A, in which the fourth voltage frequency scaling information may be configured to instruct the unit A to decrease its working frequency or working voltage.

The unit A is any one of the at least S units.

In one implementation, the voltage frequency scaling information may include fifth voltage frequency scaling information, and sending the voltage frequency scaling information to the chip according to the working state information or application scenario information of the chip may further include:

according to the working state information of the unit A, in response to the unit A being determined to return to a working state, sending the fifth voltage frequency scaling information to the unit A, in which the fifth voltage frequency scaling information may be configured to instruct the unit A to increase its working voltage or working frequency.

In one implementation, an application scenario of the chip is image recognition. The application scenario information may include the count of objects in an image to be recognized. The voltage frequency scaling information may include sixth voltage frequency scaling information, and a voltage frequency scaling unit may be further configured to:

in response to determining that the count of the objects in the image to be recognized is less than a first threshold value, send the sixth voltage frequency scaling information to the chip, in which the sixth voltage frequency scaling information may be configured to instruct the chip to decrease its working voltage or working frequency.

In one implementation, the application scenario information is object tag information, the voltage frequency scaling information may include seventh voltage frequency scaling information, and the voltage frequency scaling unit may be further configured to:

in response to determining that the object tag information belongs to a preset object tag set, send the seventh voltage frequency scaling information to the chip, in which the seventh voltage frequency scaling information may be configured to instruct the chip to increase its working voltage or working frequency.

In one implementation, the chip is applied to voice recognition, the application scenario information is a voice input rate, the voltage frequency scaling information may include eighth voltage frequency scaling information, and the voltage frequency scaling unit may be further configured to:

if the voice input rate is lower than a second threshold value, send the eighth voltage frequency scaling information to the chip, in which the eighth voltage frequency scaling information may be configured to instruct the chip to decrease its working voltage or working frequency.

In one implementation, the application scenario information is a keyword obtained by voice recognition performed by the chip, the voltage frequency scaling information may include ninth voltage frequency scaling information, and the voltage frequency scaling unit may be further configured to:

if the keyword belongs to a preset keyword set, send the ninth voltage frequency scaling information to the chip, in which the ninth voltage frequency scaling information may be configured to instruct the chip to increase its working voltage or working frequency.

In one implementation, the chip is applied to machine translation, the application scenario information may include a character input speed or the count of characters in an image to be translated, the voltage frequency scaling information may include tenth voltage frequency scaling information, and the voltage frequency scaling unit may be further configured to:

if the character input speed is lower than a third threshold value or the count of the characters in the image to be translated is less than a fourth threshold value, send the tenth voltage frequency scaling information to the chip, in which the tenth voltage frequency scaling information may be configured to instruct the chip to decrease its working voltage or working frequency.

In one implementation, the application scenario information is an external light intensity, the voltage frequency scaling information may include eleventh voltage frequency scaling information, and the voltage frequency scaling unit may be further configured to:

if the external light intensity is lower than a fifth threshold value, send the eleventh voltage frequency scaling information to the chip, in which the eleventh voltage frequency scaling information may be configured to instruct the chip to decrease its working voltage or working frequency.

In one implementation, the chip is applied to image retouching, the voltage frequency scaling information may include twelfth voltage frequency scaling information and thirteenth voltage frequency scaling information, and the voltage frequency scaling unit may be further configured to:

if the application scenario information is a face image, send the twelfth voltage frequency scaling information to the chip, in which the twelfth voltage frequency scaling information may be configured to instruct the chip to decrease its working voltage; and if the application scenario information is not a face image, send the thirteenth voltage frequency scaling information to the chip, in which the thirteenth voltage frequency scaling information may be configured to instruct the chip to decrease its working voltage or working frequency.

It is to be noted that a specific implementation process of the abovementioned method embodiment may refer to related descriptions in the embodiment shown in FIG. 1 and will not be described herein.

It is to be noted that each unit or module may be a circuit, including a digital circuit, an analogue circuit, and the like. Physical implementation of a structure of each unit or module may include, but is not limited to, a physical device, which may include, but is not limited to, a transistor, a memristor, and the like. The chip or the neural network processor may be any proper hardware processor, for example, a CPU, a GPU, an FPGA, a digital signal processor (DSP), and an ASIC. The storage unit may be any proper magnetic storage medium or magneto-optic storage medium, for example, a resistive random access memory (RRAM), a DRAM, a SRAM, an enhanced dynamic random access memory (EDRAM), a high bandwidth memory (HBM), and a hybrid memory cube (HMC), and the like.

The application may be applied to numerous universal or dedicated computer system environments or configurations, for example, a personal computer (PC), a server computer, a handheld device or a portable device, a tablet device, a multiprocessor system, a microprocessor-based system, a set-top box, a programmable consumer electronic device, a network PC, a minicomputer, a large computer, and a distributed computation environment including any abovementioned system or device.

According to an embodiment, the application provides a chip, which may include the abovementioned computation device. The chip may simultaneously perform various types of computation on a weight and an input neuron to achieve computational diversity. In addition, a dedicated on-chip cache for the multilayer artificial neural network computation algorithm is adopted, so that reusability of the input neurons and the weight data is fully mined, repeated reading of these data from the memory is avoided, a memory access bandwidth is reduced, and the problem that a memory bandwidth becomes a performance bottleneck of multilayer artificial neural network computation and a training algorithm thereof is solved.

An embodiment of the application provides a chip package structure, which may include the abovementioned neural network processor.

An embodiment of the application provides a board card, which may include the abovementioned chip package structure.

An embodiment of the application provides an electronic device, which may include the abovementioned board card.

The electronic device may include, but is not limited to, a robot, a computer, a printer, a scanner, a tablet computer, an intelligent terminal, a mobile phone, an automobile data recorder, a navigator, a sensor, a webcam, a cloud server, a camera, a video camera, a projector, a watch, an earphone, a mobile storage, a wearable device, a transportation means, a household electrical appliance, and a medical device.

The transportation means may include an airplane, a ship, and/or a vehicle. The household electrical appliance may include a television, an air conditioner, a microwave oven, a refrigerator, an electric rice cooker, a humidifier, a washing machine, an electric lamp, a gas cooker, and a range hood. The medical device may include a nuclear magnetic resonance spectrometer, a B-ultrasonic scanner, and/or an electrocardiograph.

Those of ordinary skill in the art may realize that the units and algorithm steps of each example described in combination with the embodiments of the application may be implemented by electronic hardware, computer software, or a combination of the two. For clearly describing exchangeability of the hardware and the software, compositions and steps of each example have been generally described in the descriptions according to functions. Whether these functions are performed in a hardware or software manner depends on specific applications and design constraints of the technical solutions. Professionals may realize the described functions for each specific application by use of different methods, but such realization shall fall within the scope of the application.

Those skilled in the art may clearly know that, for convenient and brief description, working processes of terminals and units described above may refer to the corresponding processes in the method embodiments and will not be elaborated herein.

In the embodiments provided by the application, it is to be understood that the disclosed terminals and methods may be implemented in other manners. For example, the device embodiment described above is only schematic. For example, division of the units is only logical function division and another division manner may be adopted during practical implementation. For example, multiple units or components may be combined or integrated into another system or some characteristics may be neglected or not performed. In addition, coupling, direct coupling, or communication connection between each displayed or discussed component may be indirect coupling or communication connection, implemented through some interfaces, devices, or units, and may be electrical, mechanical, or in other forms.

The units described as separate parts may or may not be physically separated. Parts displayed as units may or may not be physical units, and for example, may be located in the same place, or may also be distributed in multiple network units. Part or all of the units may be selected to achieve the purpose of the solutions of the embodiments of the application according to a practical requirement.

In addition, each functional unit in the embodiments of the application may be integrated into a processing unit, each unit may also physically exist independently, and two or more units may also be integrated into one unit. The integrated unit may be implemented in the form of hardware or a software functional unit.

If being implemented in the form of a software functional unit and sold or used as an independent product, the integrated unit may be stored in a computer-readable storage medium. Based on such an understanding, all or part of the technical solutions may be embodied in form of software product.

The computer software product is stored in a storage medium, including a plurality of instructions configured to enable a computer device (which may be a PC, a server, a network device, or the like) to perform all or part of the operations of the method in each embodiment of the application. The storage medium may include various media capable of storing program codes such as a U disk, a mobile hard disk, a read-only memory (ROM), a random access memory (RAM), a magnetic disk, or an optical disk.

It is to be noted that implementation modes which are not shown or described in the drawings or the body of the specification are all in forms known to those of ordinary skill in the art and are not described in detail. In addition, the definitions about each component and method are not limited to each specific structure, shape, or manner mentioned in the embodiments, to which those of ordinary skill in the art may make simple modifications or replacements.

The purposes, technical solutions, and beneficial effects of the application are further described above with the specific embodiments in detail. It is to be understood that the above is only the specific embodiment of the application and not intended to limit the application. Any modifications, equivalent replacements, improvements, and the like made within the spirit and principle of the application shall fall within the scope of protection of the application.

What is claimed:

1. A Dynamic Voltage Frequency Scaling device, comprising:
an information acquisition unit configured to acquire at least one of working state information or application scenario information of a chip, wherein the application scenario information is obtained by the chip through neural network computation; and
a voltage frequency scaling unit configured to send voltage frequency scaling information to the chip according to at least one of the working state information or the application scenario information of the chip,
wherein the chip is configured to scale at least one of a working voltage or a working frequency in response to the voltage frequency scaling information,
wherein the chip includes at least a first unit and a second unit sequentially connected,
wherein the working state information of the chip includes an operating speed of the first unit and an operating speed of the second unit,
wherein the voltage frequency scaling information includes one of:
a first voltage frequency scaling information,
a second voltage frequency scaling information,
a third voltage frequency scaling information,
a fourth voltage frequency scaling information,
a fifth voltage frequency scaling information,
a sixth voltage frequency scaling information,
a seventh voltage frequency scaling information,
an eighth voltage frequency scaling information,
a ninth voltage frequency scaling information,
a tenth voltage frequency scaling information,
an eleventh voltage frequency scaling information,
a twelfth voltage frequency scaling information, or
a thirteenth voltage frequency scaling information, and
wherein the voltage frequency scaling unit is further configured to:
in response to determining that a running time of the first unit exceeds a running time of the second unit according to the operating speed of the first unit and the operating speed of the second unit, send the second voltage frequency scaling information to the second unit, wherein the second unit is configured to decrease at least one of the working frequency or the working voltage in response to the second voltage frequency scaling information.

2. The Dynamic Voltage Frequency Scaling device of claim 1,
wherein the working state information of the chip includes an operating speed of the chip,
wherein the voltage frequency scaling unit is configured to send the first voltage frequency scaling information to the chip when the operating speed of the chip is higher than a target speed, and
wherein the chip is configured to decrease at least one of the working frequency or the working voltage in response to the first voltage frequency scaling information.

3. The Dynamic Voltage Frequency Scaling device of claim 1, wherein the voltage frequency scaling unit is further configured to:

in response to determining that the running time of the second unit exceeds the running time of the first unit according to the operating speed of the first unit and the operating speed of the second unit, send the third voltage frequency scaling information to the first unit, wherein the first unit is configured to decrease at least one of the working frequency or the working voltage in response to the third voltage frequency scaling information.

4. The Dynamic Voltage Frequency Scaling device of claim 1, wherein the chip includes at least N units, the working state information of the chip includes working state information of at least S units in the at least N units, where N is an integer larger than one and S is an integer less than or equal to N, wherein the voltage frequency scaling unit is configured to:

in response to determining that one of the S units that is in an idle state as an idle unit according to the working state information of the unit, send the fourth voltage frequency scaling information to the idle unit, wherein the idle unit is configured to decrease at least one of the working frequency or the working voltage in response to the fourth voltage frequency scaling information.

5. The Dynamic Voltage Frequency Scaling device of claim 4, wherein the voltage frequency scaling unit is further configured to:

in response to determining, that the idle unit changes to a working state as a working unit according to the working state information, send the fifth voltage frequency scaling information to the working unit, wherein the working unit is configured to increase at least one of the working voltage or the working frequency in response to the fifth voltage frequency scaling information.

6. The Dynamic Voltage Frequency Scaling device of claim 1, wherein an application scenario of the chip is image recognition, wherein the application scenario information includes the count of objects in an image to be recognized, wherein the voltage frequency scaling unit is further configured to:

in response to determining that the count of the objects in the image to be recognized is less than a recognition threshold value, send the sixth voltage frequency scaling information to the chip, where the chip is configured to decrease at least one of the working voltage or the working frequency in response to the sixth voltage frequency scaling information.

7. The Dynamic Voltage Frequency Scaling device of claim 6, wherein the application scenario information is object tag information, wherein the voltage frequency scaling unit is further configured to:

in response to determining that the object tag information belongs to a preset object tag set, send the seventh voltage frequency scaling information to the chip, wherein the chip is configured to increase at least one of the working voltage or the working frequency in response to the seventh voltage frequency scaling information.

8. The Dynamic Voltage Frequency Scaling device of claim 1, wherein the chip is applied to voice recognition, wherein the application scenario information is a voice input rate, wherein the voltage frequency scaling unit is further configured to:

when the voice input rate is lower than an input threshold value, send the eighth voltage frequency scaling information to the chip, wherein the chip is configured to decrease at least one of the working voltage or the working frequency in response to the eighth voltage frequency scaling information.

9. The Dynamic Voltage Frequency Scaling device of claim 8, wherein the application scenario information is a keyword obtained by voice recognition performed by the chip, wherein the voltage frequency scaling unit is further configured to:

when the keyword belongs to a preset keyword set, send the ninth voltage frequency scaling information to the chip, wherein the chip is configured to increase at least one of the working voltage or the working frequency in response to the ninth voltage frequency scaling information.

10. The Dynamic Voltage Frequency Scaling device of claim 1, wherein the chip is applied to machine translation, wherein the application scenario information includes a character input speed or the count of characters in an image to be translated, wherein the voltage frequency scaling unit is further configured to:

when the character input speed is lower than an input speed threshold value or the count of the characters in the image to be translated is less than a translation threshold value, send the tenth voltage frequency scaling information to the chip, wherein the chip is configured to decrease at least one of the working voltage or the working frequency in response to the tenth voltage frequency scaling information.

11. The Dynamic Voltage Frequency Scaling device of claim 1, wherein the application scenario information is an external light intensity, wherein the voltage frequency scaling information includes an eleventh voltage frequency scaling information, and wherein the voltage frequency scaling unit is further configured to:

when the external light intensity is lower than a light intensity threshold value, send the eleventh voltage frequency scaling information to the chip, wherein the chip is configured to decrease its working voltage or working frequency in response to the eleventh voltage frequency scaling information.

12. The Dynamic Voltage Frequency Scaling device of claim 1, wherein the chip is applied to image retouching, wherein the voltage frequency scaling unit is further configured to:

when the application scenario information is a face image, send the twelfth voltage frequency scaling information to the chip, where the chip is configured to decrease the working voltage in response to the twelfth voltage frequency scaling information, and when the application scenario information is not a face image, send the thirteenth voltage frequency scaling information to the chip, wherein the chip is configured to decrease at least one of the working voltage or the working frequency in response to the thirteenth voltage frequency scaling information.

13. A Dynamic Voltage Frequency Scaling method comprising:
   acquiring, by an information acquisition unit, at least one of working state information or application scenario information of a chip, wherein the application scenario information is obtained by the chip through neural network computation; and
   sending, by a voltage frequency scaling unit, voltage frequency scaling information to the chip according to at least one of the working state information or the application scenario information of the chip, and
   scaling, by the chip, at least one of the working voltage or the working frequency in response to the voltage frequency scaling information,
   wherein the chip includes at least a first unit and a second unit sequentially connected,
   wherein the working state information of the chip includes an operating speed of the first unit and an operating speed of the second unit,
   wherein the voltage frequency scaling information includes one of:
      a first voltage frequency scaling information,
      a second voltage frequency scaling information,
      a third voltage frequency scaling information,
      a fourth voltage frequency scaling information,
      a fifth voltage frequency scaling information,
      a sixth voltage frequency scaling information,
      a seventh voltage frequency scaling information,
      an eighth voltage frequency scaling information,
      a ninth voltage frequency scaling information,
      a tenth voltage frequency scaling information,
      an eleventh voltage frequency scaling information,
      a twelfth voltage frequency scaling information, or
      a thirteenth voltage frequency scaling information, and
   wherein sending the voltage frequency scaling information to the chip further includes:
      in response to determining that the running time of the first unit exceeds the running time of the second unit according to the operating speed of the first unit and the operating speed of the second unit, sending the second voltage frequency scaling information to the second unit, and
      decreasing, by the second unit, at least one of the working frequency or the working voltage in response to the second voltage frequency scaling information.

14. The Dynamic Voltage Frequency Scaling method of claim 13,
   wherein the working state information of the chip includes an operating speed of the chip,
   wherein sending the voltage frequency scaling information further includes:
      when the operating speed of the chip is higher than a target speed, sending the first voltage frequency scaling information to the chip, and
      decreasing, by the chip, at least one of the working frequency or the working voltage in response to the first voltage frequency scaling information.

15. The Dynamic Voltage Frequency Scaling method of claim 13,
   wherein sending the voltage frequency scaling information to the chip further includes:
      in response to determining, that the running time of the second unit exceeds the running time of the first unit according to the operating speed of the first unit and the operating speed of the second unit, sending the third voltage frequency scaling information to the first unit, and
      decreasing, by the first unit, at least one of the working frequency or the working voltage in response to the third voltage frequency scaling information.

16. The Dynamic Voltage Frequency Scaling method of claim 13,
   wherein the chip includes at least N units,
   wherein the working state information of the chip includes working state information of at least S units in the at least N units,
   where N is an integer larger than one and S is an integer less than or equal to N, sending the voltage frequency scaling information to the chip further includes:
      in response to determining that one of the units that is in an idle state as an idle unit according to the working state information of the unit, sending the fourth voltage frequency scaling information to the idle unit, and
      decreasing, by the idle unit, at least one of the working frequency or the working voltage in response to the fourth voltage frequency scaling information.

17. The Dynamic Voltage Frequency Scaling method of claim 16,
   wherein sending the voltage frequency scaling information to the chip further includes:
      in response to determining that the idle unit that changes to a working state as a working unit according to the corresponding working state information, sending the fifth voltage frequency scaling information to the working unit, and
      increasing, by the working unit, at least one of the working voltage or the working frequency in response to the fifth voltage frequency scaling information.

18. The Dynamic Voltage Frequency Scaling method of claim 13,
   wherein an application scenario of the chip is image recognition,
   wherein the application scenario information is the count of objects in an image to be recognized,
   wherein sending the voltage frequency scaling information to the chip further includes:
      in response to determining that the count of the objects in the image to be recognized is less than a recognition threshold value, sending the sixth voltage frequency scaling information to the chip, and
      decreasing, by the chip, at least one of the working voltage or the working frequency in response to the sixth voltage frequency scaling information.

19. The Dynamic Voltage Frequency Scaling method of claim 18,
   wherein the application scenario information is object tag information,
   wherein sending the voltage frequency scaling information to the chip further includes:
      in response to determining that the object tag information belongs to a preset object tag set, sending the seventh voltage frequency scaling information to the chip, and
      increasing, by the chip, at least one of the working voltage or the working frequency in response to the seventh voltage frequency scaling information.

20. The Dynamic Voltage Frequency Scaling method of claim 13,
   wherein the chip is applied to voice recognition,
   wherein the application scenario information is a voice input rate, and
   wherein sending the voltage frequency scaling information to the chip further includes:
   when the voice input rate is lower than an input threshold value, sending the eighth voltage frequency scaling information to the chip, and
   decreasing, by the chip, at least one of the working voltage or the working frequency in response to the eighth voltage frequency scaling information.

21. The Dynamic Voltage Frequency Scaling method of claim 20,
   wherein the application scenario information is a keyword obtained by voice recognition performed by the chip,
   wherein sending the voltage frequency scaling information to the chip further includes:
      when the keyword belongs to a preset keyword set, sending the ninth voltage frequency scaling information to the chip, and
      increasing, by the chip, at least one of the working voltage or the working frequency in response to the ninth voltage frequency scaling information.

22. The Dynamic Voltage Frequency Scaling method of claim 13,
   wherein the chip is applied to machine translation,
   wherein the application scenario information is a character input speed or the count of characters in an image to be translated,
   wherein sending the voltage frequency scaling information to the chip further includes:
   when the character input speed is lower than an input speed threshold value or the count of the characters in the image to be translated is less than a translation threshold value, sending the tenth voltage frequency scaling information to the chip, and
   decreasing, by the chip, at least one of the working voltage or the working frequency in response to the tenth voltage frequency scaling information.

23. The Dynamic Voltage Frequency Scaling method of claim 13,
   wherein the application scenario information is an external light intensity,
   wherein sending the voltage frequency scaling information to the chip further includes:
   when the external light intensity is lower than a light intensity threshold value, sending the eleventh voltage frequency scaling information to the chip, and
   decreasing, by the chip, at least one of the working voltage or the working frequency in response to the eleventh voltage frequency scaling information.

24. The Dynamic Voltage Frequency Scaling method of claim 13,
   wherein the application scenario information is image retouching,
   wherein the voltage frequency scaling information includes a twelfth voltage frequency scaling information and a thirteenth voltage frequency scaling information, and
   wherein sending the voltage frequency scaling information to the chip further includes:
   when the application scenario information is a face image, sending the twelfth voltage frequency scaling information to the chip,
   decreasing, by the chip, the working voltage in response to the twelfth voltage frequency scaling information,
   when the application scenario information is not a face image, sending the thirteenth voltage frequency scaling information to the chip, and
   decreasing, by the chip, at least one of the working voltage or the working frequency in response to the thirteenth voltage frequency scaling information.

* * * * *